July 21, 1953  D. R. DE BOISBLANC  2,645,949
PRESSURE BALANCE INDICATOR
Filed May 9, 1949

INVENTOR.
D. R. DE BOISBLANC
BY Hudson & Young
ATTORNEYS

Patented July 21, 1953

2,645,949

UNITED STATES PATENT OFFICE 2,645,949

PRESSURE BALANCE INDICATOR

Deslonde R. de Boisblanc, Bartlesville, Okla., assignor to Phillips Petroleum Company, a corporation of Delaware Application May 9, 1949, Serial No. 92,183

3 Claims. (Cl. 73—53)

This invention relates to a pressure balance indicator for measuring the vapor pressure of a liquid.

Heretofore, vapor pressures have ordinarily been measured by placing a predetermined amount of liquid in a vessel or bomb, said vessel being provided with a region above the liquid level which is connected to a pressure gauge. Thus, the pressure gauge indicated the vapor pressure when the liquid in the vessel reached equilibrium with its vapor. Such devices are ordinarily maintained at a predetermined temperature so that comparisons between the pressures of different liquids may be readily made. For many purposes, pressure gauges of the conventional type were not sufficiently accurate for the purposes of the vapor pressure determinations. Accordingly, in many cases, the reading of the pressure gauge was noted when it was connected to the vapor space in the vessel, after which the pressure gauge was removed and connected to a sensitive instrument, such as a manometer, which was then adjusted until the gauge indicated the reading previously noted in testing the vapor. The actual pressure was then indicated by the manometer reading. In this manner, variations in the calibration of the pressure gauge were compensated for and results of somewhat greater accuracy were obtained than was the case when readings were taken directly from the pressure gauge. This procedure, of course, required removal of the pressure gauge from the vessel each time a vapor pressure determination was made, and some inaccuracies were introduced by the use of the pressure gauge as an intermediate balancing element.

It is an object of this invention to provide apparatus for measuring vapor pressure in a very accurate manner without the cumbersome manipulations required by previous procedures.

It is a further object of the invention to provide a pressure balance indicator particularly adapted for use in making vapor pressure determinations.

It is a still further object of the invention to provide apparatus which is accurate, reliable in operation, rugged, and economical to build and manufacture.

Various other objects, advantages and features of the invention will become apparent to those skilled in the art from the accompanying drawings, in which.

Figure 1:
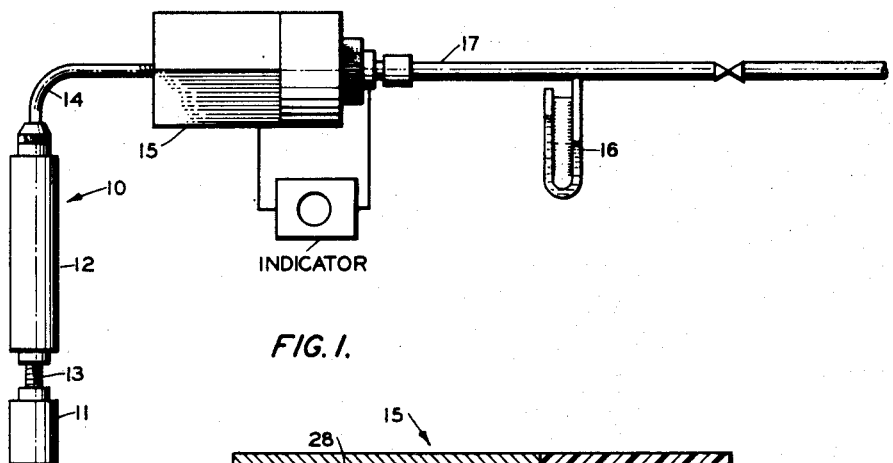
Figure 1 is a front elevational view of the apparatus for determining vapor pressures.

Referring now to the drawings in detail, and particularly to Figure 1, the apparatus comprises a conventional vessel or bomb 10 of the type previously used in making vapor pressure determinations. This vessel includes a liquid receptacle 11 communicating with a vapor-containing portion 12 through a conduit 13. In the operation of this apparatus, the receptacle 11 is filled with liquid to a predetermined level and, as a result, a vapor pressure exists in the unit 12 which is characteristic of the liquid under test. The liquid and vapor are preferably maintained at a constant predetermined temperature during the vapor pressure determination, and the apparatus is ordinarily provided with a pressure gauge at its upper end which directly indicates the vapor pressure. The form of apparatus shown is so designed that receptacle 11 may be removed and immersed in the liquid to be tested to fill it to a predetermined level. However, where it is desired to sample a liquid under high pressure, the unit may be provided with valves for admitting and removing the pressure fluid, as those skilled in the art will readily understand.

In accordance with the invention, the upper end of the unit 12 is connected by conduit 14 to a pressure balancing device 15. The vapor pressure of the test liquid in the device 15 is opposed to pressure read by a manometer 16 which is connected to a conduit 17, a portion of which should be formed from flexible material. The conduit 17, in turn, is connected by a suitable valve to a source of fluid under pressure, not shown. The pressure in conduit 17 is adjusted until said pressure is equal to the vapor pressure of the liquid to be tested, which is indicated by an indicator attached to the casing of balancing device 15. The vapor pressure of the test liquid may then be read directly upon the manometer scale with a high degree of accuracy. In this manner, the difficulties incident upon the use of a conventional pressure gauge are eliminated and, where extreme accuracy is necessary, it is not necessary to remove such a pressure gauge from the test unit and connect it to a manometer each time a vapor pressure determination is made.

Figure 2:
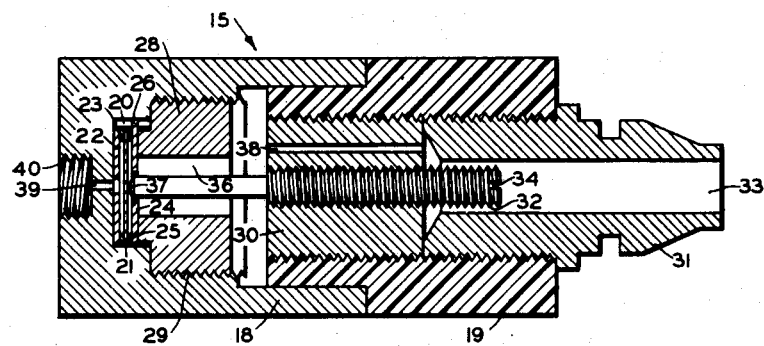
Figure 2 is a vertical sectional view of the pressure balance indicator.
Figure 3:
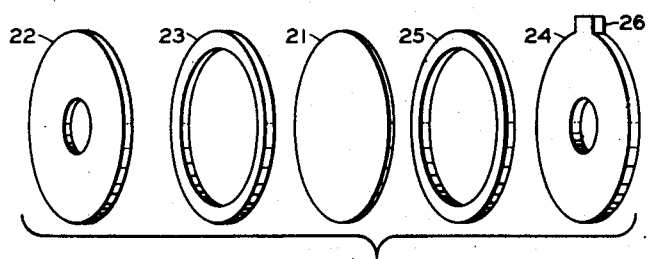
Figure 3 is a view of the diaphragm and cooperating elements used in the indicator of Figure 2 with the parts in disassembled relation.

The novel pressure balancing device is shown in detail by Figures 2 and 3. This unit includes a casing defined by two telescoped sleeve members 18 and 19, the member 18 being shaped to form a chamber 20 having a diaphragm 21 disposed therein. A supporting structure is provided at each side of the diaphragm to hold it in proper seated position within the chamber. This supporting structure includes an apertured metal disc 22 and a washer 23 mounted at one side of the diaphragm together with an apertured disc 24 and a washer 25 mounted at the other side of the diaphragm. The plate 24 has a lug 26 formed thereon which protrudes into a slot formed in the diaphragm chamber, this slot cooperating with the lug to prevent rotation of the plate 24. In order to force the elements of the diaphragm chamber into proper assembled position, the plate 24 is engaged by a threaded plug 28 which is mounted in an enlarged threaded passage 29 formed in the member 18.

The casing member 19 is formed from insulating material and has an interior threaded passage which is shaped to receive a threaded metal bushing 30 and an outlet fitting 31 which is adapted for connection to the conduit 17 of Figure 1. The bushing 30, in turn, has a threaded interior passage which receives a contact rod 32 having a threaded portion engageable with the interior threads in bushing 30. One end of the contact rod protrudes into a passage 33 formed in fitting 31, and this end of the rod is provided with a slot 34 to facilitate longitudinal adjustment of the contact rod by rotation thereof in the threaded bushing 30. The other end of contact rod 32 extends through a passage 36 formed in plug 28 and through the aperture in plate 24 so that its end portion 37 is closely spaced to diaphragm 21. When the diaphragm is flexed to a predetermined extent, the diaphragm engages the end portion 37 of the contact rod thus closing an electrical circuit between the contact rod, the diaphragm, the casing, together with the leads and indicator shown by Figure 1, the indicator including a suitable current source for the electrical circuit.

It will be apparent that pressure fluid from conduit 17 is admitted to one side of the diaphragm chamber through the passage 33, a bore 38 in bushing 30, the passage 36, and the aperture in plate 24 to one side of the diaphragm chamber. The other end of the diaphragm chamber is connected to conduit 14 and pressure bomb 10 by a bore 39 communicating with an enlarged threaded outlet passage 40. In operation of the device, contact portion 37 is normally in engagement with the diaphragm, and the pressure in conduit 17 is so adjusted that it is less than that in the bomb 10. Thereupon, the pressure conduit 17 is gradually raised until the circuit between contact portion 37 and the diaphragm is opened, thus indicating that the pressures are balanced. The vapor pressure is then read upon the manometer in the manner previously explained.

Figure 4:
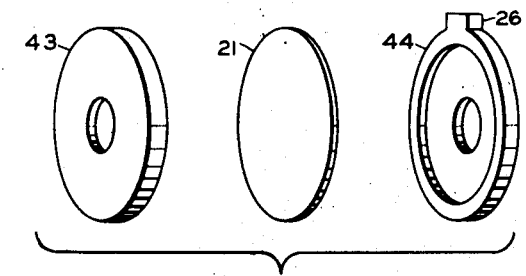
Figure 4 is a view of a modification of the invention with the parts in disassembled relation.

It is a feature of the invention that diaphragm 21 cannot be injured due to an excessive pressure differential between the two sides of the diaphragm chamber. This is accomplished by the provision of the plates 22, 24 and washers 23, 25. The diaphragm may flex freely to the extent permitted by the washers 23, 25 but application of an extreme pressure differential between the two sides of the chamber causes the diaphragm to engage one of the plates 22, 24 thus preventing further flexing of the diaphragm with resultant damage thereof. In addition, the parts are secured in a securely locked position by the plug 28 without disturbing the free access of fluid to the sides of the diaphragm chamber through passages 36 and 39. In some cases, plate 22 may be omitted and washer 23 fitted directly upon the adjacent casing wall. Alternatively, washers 23, 25 may be integrally formed with the plates 22 and 24, respectively, to form integral plate and flange units 43 and 44, as shown by Figure 4. Adjustable contact 32 permits the unit to be adjusted so that the diaphragm operates at its region of greatest sensitivity.

The apparatus of the present invention has been found to be very reliable in operation and extremely sensitive. For example, with both the bomb and manometer at atmospheric temperature and pressure and the contact rod spaced very closely to the diaphragm, operation of the diaphragm occurs to a sufficient extent as to engage it with contact 37 and the signalling device merely by placing a hand upon the barrel of bomb 12, the increase in pressure within the vessel 10 resulting from the very slight heat flowing into the vessel being ample to cause actuation of the mechanism. The apparatus is convenient for use since it is not necessary to disconnect a pressure valve from the bomb and connect such gauge to the manometer each time a vapor pressure determination is made. Accordingly, it will be apparent I have provided an extremely sensitive instrument which may be readily manipulated, even by an unskilled operator.

While the invention has been described in connection with a present, preferred embodiment thereof, it is to be understood that this description is illustrative only, and is not intended to limit the invention, the scope of which is defined by the appended claims.

Having described my invention, I claim:

1. Apparatus for determining the vapor pressure of fluids comprising, in combination, a pressure balance indicator including a casing defining a diaphragm chamber, a diaphragm mounted in said chamber, supporting means for each side of said diaphragm including an apertured flat plate closely spaced to said diaphragm and seated in said chamber, one of said plates having a lug protruding therefrom which extends into a recess in said casing to prevent rotation of said plate, a washer interposed between the peripheral region of each plate and the outer portion of the diaphragm, an apertured plug screw-threaded in said casing, said apertured plug abutting one of said plates to force said plates, said washers, and said diaphragm into assembled position, a contact arm threaded and insulatedly mounted within said casing, said arm having one end thereof extending through the aperture in one of said plates and said plug into a closely spaced position with respect to said diaphragm whereby flexure of the diaphragm causes it to engage said contact arm, a container adapted for the vaporization of liquid to be tested, means connecting said container to one side of the diaphragm chamber, and an outlet conduit connected to the other side of the diaphragm chamber, for connection to a source of balance pressure.

2. The apparatus of claim 1 wherein each flat plate is formed integrally with its associated washer.

3. Apparatus for determining the vapor pressure of fluids comprising, in combination, a pressure balance indicator including a casing defining a diaphragm chamber, a diaphragm mounted in said chamber, supporting means for each side of said diaphragm including an apertured flat plate closely spaced to said diaphragm and seated in said chamber, one of said plates having a lug protruding therefrom which extends into a recess in said casing to prevent rotation of said plate, a washer interposed between the peripheral region of each plate and the outer portion of the diaphragm, an apertured plug screw-threaded in said casing, said apertured plug abutting one of said plates to force said plates, said washers, and said diaphragm into assembled position, a contact arm threaded and insulatedly mounted within said casing, said arm having one end thereof extending through the aperture in one of said plates and said plug into a closely spaced position with respect to said diaphragm whereby flexure of the diaphragm causes it to engage said contact arm, the other end of said arm having a slot formed therein for adjustment thereof and being disposed within said casing so that it is protected from accidental movement during operation of the balance indicator, a container adapted for the vaporization of liquid to be tested, means connecting said container to one side of the diaphragm chamber, and an outlet conduit connected to the other side of the diaphragm chamber, for connection to a source of balance pressure.

DESLONDE R. DE BOISBLANC.

References Cited in the file of this patent

UNITED STATES PATENTS

| Number | Name | Date |
|---|---|---|
| 318,691 | Brown | May 26, 1885 |
| 1,692,513 | Newell | Nov. 20, 1928 |
| 2,143,795 | Okey | Jan. 10, 1939 |
| 2,392,581 | DeJuhasz | Jan. 8, 1946 |

FOREIGN PATENTS

| Number | Country | Date |
|---|---|---|
| 421,043 | Germany | Nov. 4, 1925 |
| 521,886 | Great Britain | June 3, 1940 |

OTHER REFERENCES

Publication, "Society Automotive Engineers Journal," vol. 52, No. 11, pages 552–554, November 1944.